Feb. 25, 1930.　　　H. T. PURFIELD　　　1,748,394
SAW FILING MACHINE ATTACHMENT
Filed Sept. 20, 1928　　　3 Sheets-Sheet 1
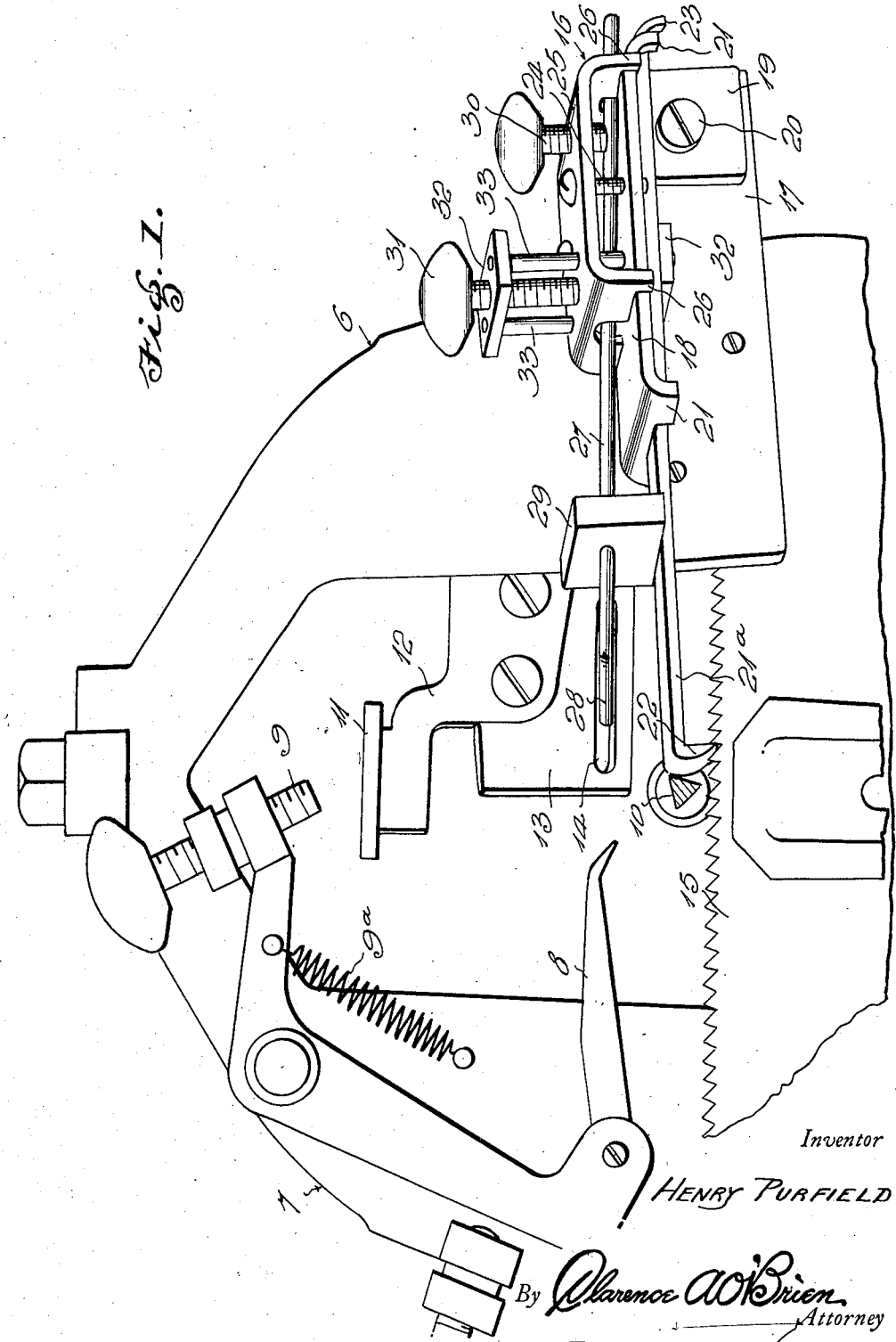
Inventor
HENRY PURFIELD
By Clarence A. O'Brien
Attorney

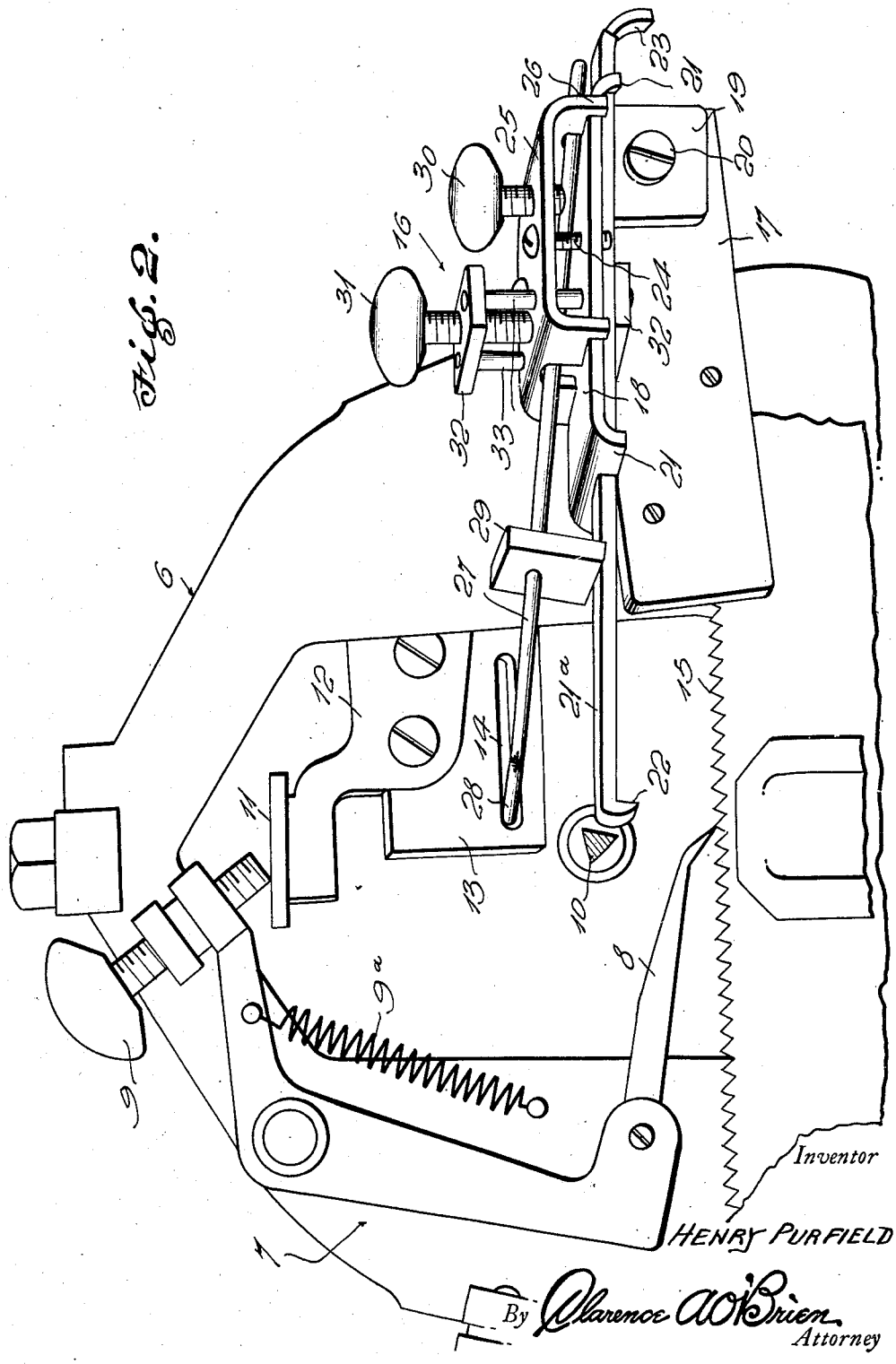

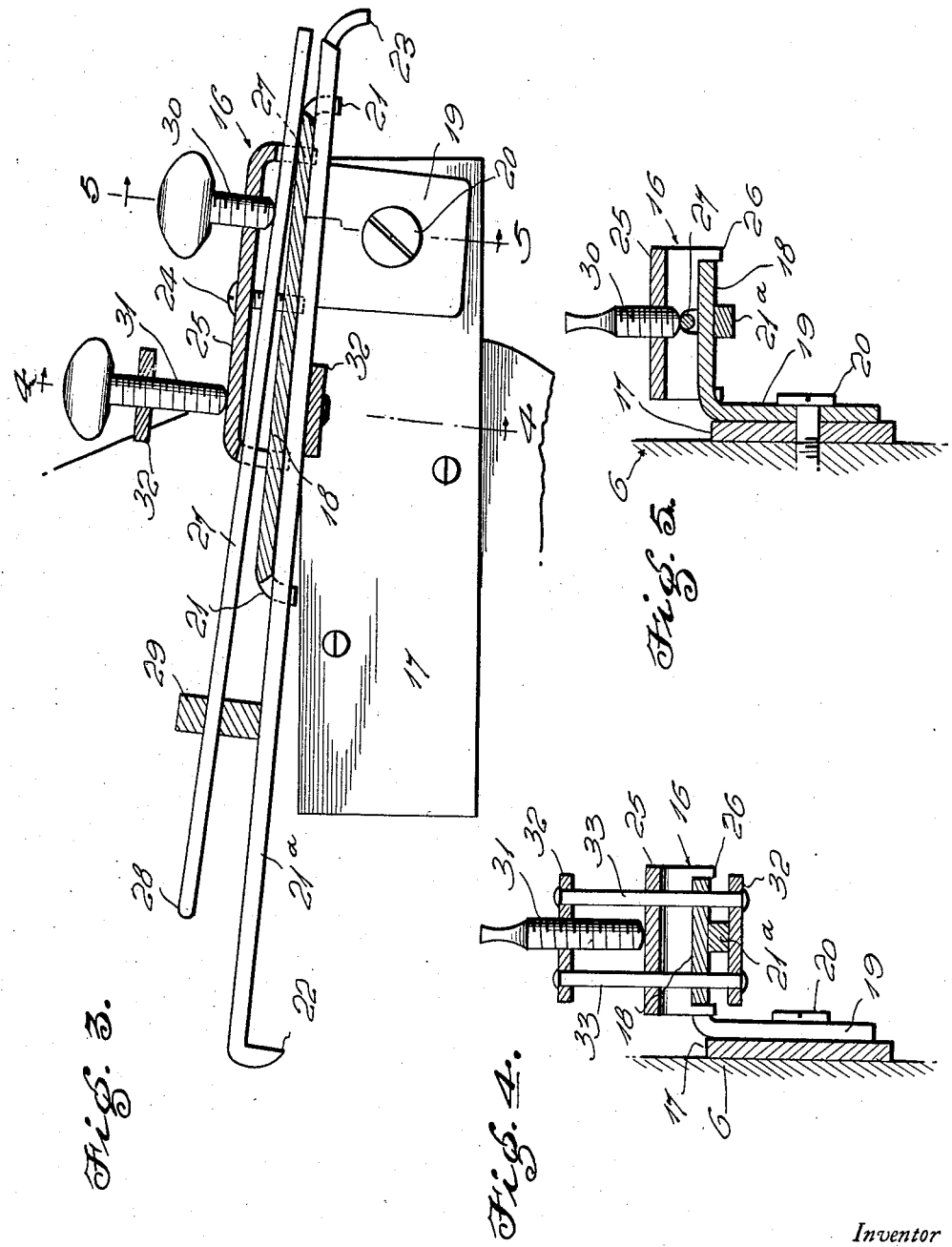

Patented Feb. 25, 1930

1,748,394

UNITED STATES PATENT OFFICE

HENRY T. PURFIELD, OF ANN ARBOR, MICHIGAN

SAW-FILING-MACHINE ATTACHMENT

Application filed September 20, 1928. Serial No. 307,148.

This invention relates to an improved attachment for a saw filing machine and it has more particular reference to an attachment especially constructed for use in association with the well known Foley type of saw tool machine.

More specifically speaking, it has reference to an attachment such as is adaptable for use for example upon a structure such as is shown in Patent No. 1,224,293 under date of May 1, 1917, and Patent No. 1,674,853 of June 26, 1928.

Generally speaking, saw filing machines of the type referred to embody, among other details, a special file holder, means for imparting saw filing movement to this file holder, a saw feeding dog or pawl, means for causing the pawl to engage the last filed tooth, and an automatically and well timed operating means for the pawl to cause it to move the saw and to position the tooth last filed to a predetermined distance beyond the position in which it was previously filed.

These machines are subject to the disadvantage of permitting longitudinal slippage of the saw during the reciprocatory motion of the file. This produces defects and inaccuracies in the filing operation, which are successfully overcome by the attachment constituting the subject matter of this invention.

Broadly construed, the gist of the invention is the provision of an attachment which may be applied to a Foley type of machine, without requiring alterations of the existing parts, the attachment being associated with and operable by that means which serves to operate the file holder. The attachment, is, broadly stated, a retainer which comes in proper timed relation to engage the tooth just filed, and to thereby firmly hold the saw in place just before the file gets into its tooth. The result is that the saw is firmly held and the teeth measured and cut with exceptional accuracy.

In carrying out the invention I have endeavored to accomplish this desirable result through the medium of a structure which is characterized by unusual compactness and convenience in arrangement of parts, being such and so arranged as to produce a structure which is positive and dependable in action, smooth and quiet in operation, and especially suitable for accomplishing the requirements of an invention of this nature in an efficient manner.

In the drawings:

Figure 1 is a perspective view showing the attachment applied to a saw filing machine of the single pawl type with the retaining element of the attachment engaged with one of the saw teeth.

Figure 2 is a view like Figure 1 showing the retaining element and file disengaged from the saw.

Figure 3 is a longitudinal sectional view through the attachment per se.

Figures 4 and 5 are vertical sectional views taken approximately upon the planes of the lines 4—4 and 5—5 of Figure 3.

Referring now to the parts of the Foley automatic saw filer, as far as they are shown in the drawings, it will be seen that 6 designates generally a stationary portion of the frame carrying the left hand rocker arm 7 which in turn carries the feed pawl 8 for feeding the saw up to the filing arm from the left side of the machine. Associated with the rocker arm and frame is the usual retention spring 9, and on the short arm of the rocker arm is a thumb screw 9, the purpose of this screw is for the final adjustment for forward travel of the feed pawl to bring the saw tooth in perfect position under the file, an exceptionally important adjustment for accurate filing. Associated with the feed pawl mechanism is a jointing guide (not shown) used on all straight across filing to feed the saw through the filer. The file is designated at 10 and this is mounted in a well known manner on the movable carriage, and file holder.

The table portion 11 cooperates with the thumb screw 9, and the arm portion 12 constitutes a mounting element for a spring anchoring plate 13 constituting a part of the attachment. This plate is provided with a horizontally elongated slot 14. The adjustable saw is designated at 15.

The attachment is generally designated by the reference numeral 16. This comprises an attaching plate 17 rigidly fastened to the frame. This projects out beyond the frame and constitutes a mounting for the swingable part of the attachment. This swingable part comprises a bottom plate 18 having a down turned ear 19 pivoted at 20 to the attaching plate. The opposite ends of this plate 18 are directed downwardly and bifurcated, the furcations being designated by the reference numerals 21. The notches formed between the furcations constitute guides for the stem portion 22 of the retaining element. One end of this terminates in a hook 22 which is constructed to engage the saw teeth and which is located in close proximity to the file 10 as shown. The opposite end is curved as at 23 to provide a finger hook whereby this element may be longitudinally adjusted. Fastened by screws or the like, 24, to the bottom plate is a similarly shaped top plate 25 having feet 26 straddling the longitudinal edge portion of the bottom plate, and having notches for accommodating the rod portion 27 of a tensioning spring. One end of the spring is directed laterally as at 28 and through the aforesaid slot 14. On this spring rod is a slidable pressure block 29 which bears down on the intermediate portion of the retaining element 21. The spring is held in adjusted position by a set screw 30 carried by the top plate 25 and engaging the outer end portion of the spring as shown. In addition, a similar set screw 31 is provided, and this is mounted to adjustably support a slidable retainer for the retaining element 21. The last named retainer is more in the nature of a clamp and comprises a pair of small plates 32 connected together by rods 33 extending through openings in the two plates 18 and 25, respectively. The upper plate 32 has its screw threaded opening to accommodate the shank of the thumb screw, and the thumb screw bears down on the top plate 25. Obviously, then the position of the hook 22 is adjusted by sliding the retaining rod 21. The rod can be easily slid by the hook 23 after loosening the adjustable clamp and set screw 31. The spring rod 27 is independently adjustable.

As before stated, the purpose of the attachment is to prevent slipping of the saw in the vise under the impact produced by the reciprocatory action of the file. The presence of this attachment aids the machine in filing with such accuracy as to size and alinement that the saw cuts with remarkable smoothness and speed. The relationship of the attachment to the existing file holder and operating means for the file holder is such that the teeth on the sliding retainer element rises and descends with the file, but alternately with respect to the feed pawl, which pushes tooth after tooth of the saw under the file. As before intimated, the retaining device is so set as to drop into the notch between the tooth just filed, and it firmly holds the saw in place just before the file gets down to its work.

In using this attachment it is not necessary to clamp the saw in the vise excessively tight. Just "hand tight" is sufficient. This makes it easier on the feed pawl and on the machine generally, so prolonging the life of all of its wearing parts. Experience has shown that a retainer of this kind operating in conjunction with the other features of the machine is practically undispensable to insure accurate and positive work. It is thought however that the construction, features and advantages of the invention will be quite clear after considering the description in connection with the drawings. Therefore, a more lengthy description is regarded unnecessary.

Minor changes in shape, size, and rearrangement of parts coming within the field of invention claimed may be resorted to in actual practice if desired.

Having thus described the invention, what I claim as new and desire to secure by Letters Patent is:

1. An attachment for a saw filing machine of the class described comprising an attaching plate, a carrier swingably mounted on said plate, and a hooked retaining element longitudinally adjustable on said carrier, a spring rod adjustable on said carrier, and a slotted anchoring plate for one end of the spring rod.

2. In a structure of the clase described, an attaching plate adapted to be connected with a stationary frame, a slotted anchoring plate adapted to be connected with a movable part of operating means for a file holder, a two part carrier, one part having a depending ear swingably mounted on said attaching plate, a hooked retaining element adjustable on said carrier, a spring rod also adjustably mounted on the carrier, said spring rod having one end constructed for engagement in the slot in said slotted anchoring plate, and a block slidable on said spring rod and engageable with the intermediate portion of the retaining element.

3. An attachment for saw filing machines of the class described comprising an attaching plate, a slotted anchoring plate, a carrier comprising upper and lower plates disposed in superposed relation, the lower plate being formed with a depending ear pivotally mounted on said attaching plate, said lower plate having its opposite ends bifurcated, a retaining element having a retaining hook at one end and a finger hook at the other end, the intermediate portion thereof being slidable between said furcations, an adjustable clamp mounted on the carrier and cooperable with said retaining element, a spring rod adjustable on said carrier and cooperable with the upper plate, a set screw for maintaining said spring rod in adjusted position, a block slidable on said first rod and in contact with said retaining element, one end of said spring rod being directed laterally and extending into the slot in the anchoring plate.

In testimony whereof I affix my signature.

HENRY T. PURFIELD.